(12) United States Patent
Kuroda et al.

(10) Patent No.: US 10,213,844 B2
(45) Date of Patent: Feb. 26, 2019

(54) DRILL

(71) Applicant: KYOCERA Corporation, Kyoto-shi, Kyoto (JP)

(72) Inventors: Masahiko Kuroda, Higashiomi (JP); Yoji Nakazono, Higashiomi (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 100 days.

(21) Appl. No.: 14/900,026

(22) PCT Filed: Jun. 18, 2014

(86) PCT No.: PCT/JP2014/066171
§ 371 (c)(1),
(2) Date: Dec. 18, 2015

(87) PCT Pub. No.: WO2014/208421
PCT Pub. Date: Dec. 31, 2014

(65) Prior Publication Data
US 2016/0144436 A1  May 26, 2016

(30) Foreign Application Priority Data

Jun. 26, 2013  (JP) .................................. 2013-133913
Aug. 22, 2013  (JP) .................................. 2013-172395

(51) Int. Cl.
*B23B 51/02*  (2006.01)
*B23B 51/10*  (2006.01)

(52) U.S. Cl.
CPC ............ *B23B 51/02* (2013.01); *B23B 51/105* (2013.01); *B23B 2251/04* (2013.01);
(Continued)

(58) Field of Classification Search
CPC .......... B23B 2251/04; B23B 2251/082; B23B 2251/14; B23B 2251/18; B23B 2251/406; B23B 51/02
See application file for complete search history.

(56) References Cited

U.S. PATENT DOCUMENTS 5,088,863 A * 2/1992 Imanaga ................. B23B 51/02
 408/144
2010/0215452 A1 8/2010 Jindai et al.
2015/0283624 A1* 10/2015 Jindai ..................... B23B 51/02
 408/230

FOREIGN PATENT DOCUMENTS

JP 61-191811 U 11/1986
JP 11-197926 A 7/1999
(Continued)

OTHER PUBLICATIONS

English translation of JP-030306, Feb. 2012.*
(Continued)

*Primary Examiner* — Alan Snyder
(74) *Attorney, Agent, or Firm* — Volpe and Koenig, P.C.

(57) ABSTRACT

The drill (1) is provided with a drill body (2) having a rotation center axis (O), two cutting edges (3) provided on the tip side of the drill body (2), and chip evacuation flutes (10) provided behind the two cutting edges (3) in the direction of rotation of the drill (1) from the two cutting edges, the drill tip angle ($\alpha$) being from 170 to 190°, the web thickness (d) being from 0.10 to 0.25 times the drill diameter (D), the opening angle ($\gamma$) of the chip evacuation flutes (10) being from 85 to 110°, and the drill (1) comprising a curve having a radius of curvature that gradually decreases from the cutting edge side wall surface (14) to the heel side wall surface (15) of the chip evacuation flutes (10) in a cross-section at a position where the chip evacuation flutes (10) are present.

11 Claims, 2 Drawing Sheets

(52) U.S. Cl.
CPC ..... *B23B 2251/082* (2013.01); *B23B 2251/14* (2013.01); *B23B 2251/18* (2013.01); *B23B 2251/406* (2013.01); *B23B 2251/426* (2013.01)

(56) References Cited

FOREIGN PATENT DOCUMENTS

| | | |
|---|---|---|
| JP | 2001-341016 A | 12/2001 |
| JP | 2009-56534 A | 3/2009 |
| JP | 2012-30306 A | 2/2012 |
| WO | 2009/054400 A1 | 4/2009 |

OTHER PUBLICATIONS

Japanese Office Action with English concise explanation, Japanese Patent Application No. 2015-524000, dated Feb. 7, 2017, 5 pgs.
International Search Report (Form PCT/ISA/210) dated Sep. 16, 2014 and issued for International Application No. PCT/JP2014/066171.

\* cited by examiner

DRILL

TECHNICAL FIELD

The present invention relates to a drill, and in particular relates to a drill used for machining guide holes or spot faced holes.

BACKGROUND ART

When it is necessary to perform deep hole drilling into a slanting surface, conventionally a seating face is machined in advance using a 2-Flute square end mill, and then the hole is machined using a drill. The center of the tip side of a square end mill has a depressed shape, so the center of the bottom face that has been machined in advance with the square end mill is a protruding machined surface, and thus there is a possibility that when subsequently machining the hole using a drill the machining will be carried out with the drill in a slanted state. Also, when machining a spot faced hole, it is required that the machined bottom face is flat.

Therefore, in Patent Document 1, a drill for spot facing to provide a flat machined bottom face is disclosed with a tip angle of 170 to 190°, a drill web thickness of 0.20 to 0.40 times the drill diameter, the concavity depth of the cutting edges is from 0.01 to 0.06 times the drill diameter, and the receding angle of the outer peripheral ends of the cutting edges is from −1 to −20°. In the drill according to Patent Document 1, the opening angle of a flute provided in the rotational direction on the cutting edges is greater than 90°. Also, in Patent Document 2, a drill is disclosed in which the opening angle (flute width) of the flute provided on the cutting edges in the rotational direction is from 75 to 85°, the concavity depth on the cutting edge side is from 0.03 to 0.07 times the drill diameter, and the concavity depth on the heel side is from 0.35 to 0.70 times the drill diameter. Also, by making the opening angle of the flute from 75 to 85°, the chips are curled small, and the chip evacuation performance is increased.

CITATION LIST

Patent Literature

Patent Literature 1: Japanese Unexamined Patent Application Publication No. 2009-56534A
Patent Literature 2: Japanese Unexamined Patent Application Publication No. 2012-30306A

SUMMARY OF INVENTION

Technical Problem

However, in the drill disclosed in Patent Document 1, the opening angle of the flute is large, so although it is difficult for the chips to become blocked, the chips are retained within the flute without being divided, so the inner wall face of the machined hole is damaged by the chips and the machined surface becomes rough, and in some cases the chips bite into the cutting edges and cause breakage. Also, in Patent Document 2, the opening angle of the flute is small, so although the chips can easily curl upon contact with the wall surface of the flute, when the quantity of chips evacuated is large, evacuation of the chips becomes impossible so the chips become blocked within the flute, and likewise the machined surface becomes rough, and in some cases breakage is caused.

The present invention has been devised to solve these problems, and to provide a drill having excellent chip evacuation performance even under machining conditions resulting in a large amount of chip evacuation.

Solution to Problem

The drill according to the present invention includes: a drill body having a rotation center axis; two cutting edges provided on a tip side of the drill body; a chip evacuation flute provided to a rear of the two cutting edges and in a drill rotational direction from each of the two cutting edges; and two heels provided in a drill counter rotation direction from the two cutting edges. The drill tip angle is from 170 to 190°, the web thickness is from 0.10 to 0.25 times the diameter of the drill, and the chip evacuation flute opening angle is from 85 to 110°. In a cross-section orthogonal to the rotation center axis at a position where the chip evacuation flute is present, within the chip evacuation flute the radius of curvature gradually becomes smaller from a cutting edge side wall surface at a position on the cutting edge side towards a heel side wall surface at a position on the heel side.

Advantageous Effects of Invention

According to the drill of the present invention, the drill tip angle is from 170 to 190°, so the machined flute bottom face is flat, so it is ideal for spot facing. Also, when subsequently processing a guide hole for processing the hole with a drill, the hole can be processed with high positional accuracy, without processing with the drill in a slanted attitude. Also, the web thickness is from 0.10 to 0.25 times the diameter of the drill, the chip evacuation flute opening angle is from 85 to 110°, and in a cross-section orthogonal to the rotation center axis at a position where the chip evacuation flute is present, within the chip evacuation flute the radius of curvature gradually becomes smaller from a cutting edge side wall surface at a position on the cutting edge side towards a heel side wall surface at a position on the heel side. Consequently, it is difficult for the chips to be curled small or broken, but the chips are curled to an appropriate extent, and smoothly transported to the rear along the curved surface of the chip evacuation flute. Therefore, the chips can maintain good chip evacuation performance without becoming blocked within the chip evacuation flute, even when the evacuation rate is increased.

DESCRIPTION OF EMBODIMENTS

The following is a description of the drill according to the present invention using FIGS. 1 to 5.

A drill 1 of FIGS. 1 to 5 is a solid-type drill, and at least the portions that include a cutting edge 3 are made from a hard material such as a cemented carbide alloy, cermet, or cBN, and the drill 1 includes a drill body 2 with a substantially circular cylindrical shape with a diameter D with a rotation center axis O as center.

Figure 1A:
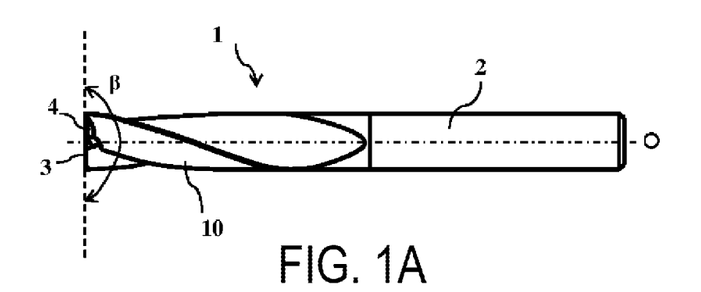
FIG. 1A is a side view illustrating an embodiment of the drill according to the present invention.
Figure 1B:
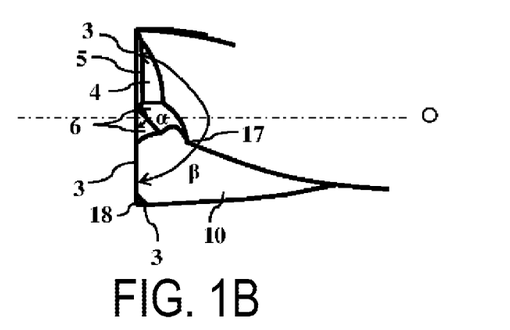
FIG. 1B is a partial enlarged side view.
Figure 2:
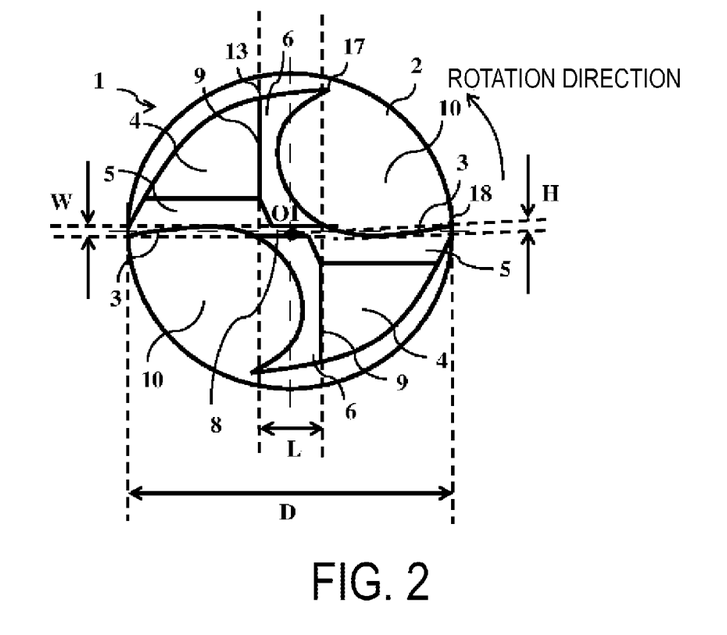
FIG. 2 is a front view of the drill of FIG. 1 viewed from the tip.

According to FIGS. 1 and 2, the drill 1 includes the drill body 2 having the rotation center axis O, two cutting edges 3 provided on the tip side of the drill body 2, a chip evacuation flute 10 provided to the rear of the two cutting edges 3 and in the rotational direction of the drill 1 from two cutting edge 3, and a heel 4 provided in contact with the chip evacuation flute 10 in a position opposite the cutting edge 3.

Also, the cutting edge 3 is provided from near the center O1 of the drill 1 to the outer peripheral edge of a circle of diameter D, and is continuous with the side surface of the drill body 2. In other words, the drill body 2 includes two cutting edges 3, two chip evacuation flutes 10, two heels 4, and two first gashes 6. Also, a heel trailing edge 13 of the heel 4 on the side opposite to the cutting edge 3 is provided in contact with the chip evacuation flute 10 in a position opposite the cutting edge 3.

In the front view of FIG. 2 viewed from the tip, a tip relief face 5 is provided in the counter rotational direction to the cutting edge 3. Also, in accordance with FIG. 1, at the tip of the drill 1, the first gash 6 is provided from the heel trailing edge 13 of the heel 4 on the opposite side to the cutting edge 3 to a first gash terminating point 17 towards the rear direction (rear end side of the drill 1) in the counter rotational direction. In other words, in the counter rotational direction, the cutting edge 3—the tip relief face 5—the heel 4—the first gash 6—the chip evacuation flute 10 are disposed in that order. The first gash 6 reduces the contact resistance at the center portion near the rotation center axis O of the tip of the drill 1.

Also, as illustrated in FIG. 1, the chip evacuation flute 10 is provided on the outer periphery of the drill body 2 in a spiral shape from the tip of the drill body 2 for a predetermined length. The intersecting ridge line between the chip evacuation flute 10 and the tip relief face 5 is the cutting edge 3. Note that in FIG. 1, the rotation center axis O is indicated with a dashed-dotted line.

In the present embodiment, in the side view illustrated in FIG. 1, the drill tip angle α is from 170 to 190°. In other words, when the drill tip angle α is smaller than 170°, the machined flute bottom face is undulating in the center with a large protruding shape, so when subsequently machining the hole using a drill for deep hole drilling, the drill for deep hole drilling is inclined and the machined hole is formed slanted. Also, when the drill tip angle α exceeds 190°, the unmachined bottom face has a large depression in the center. Moreover, the thickness of the outer peripheral side edge portion of the cutting edge 3 of the drill 1 is small, so the strength of the outer peripheral side edge portion is small. Therefore, the outer peripheral side edge portion of the drill 1 is easily damaged. Note that the drill tip angle α is defined as the angle formed between the two cutting edges 3, 3 in the side view.

Figure 3:
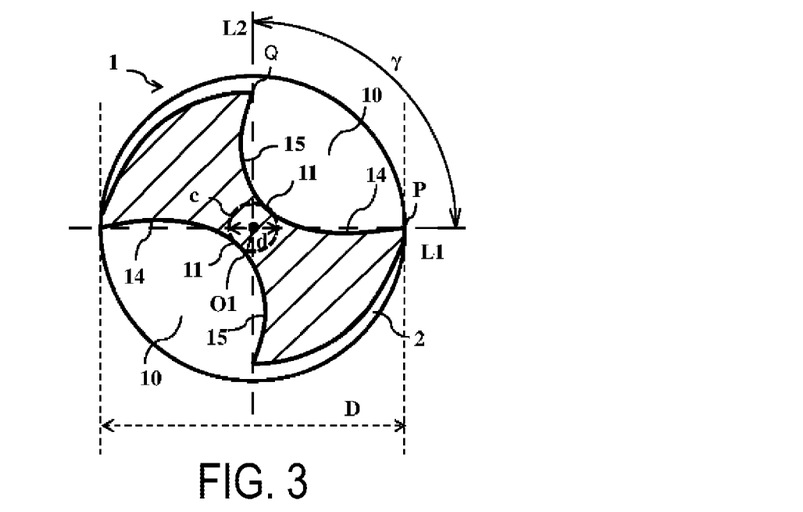
FIG. 3 is a cross-sectional view orthogonal to the rotation center axis of the drill at a position on the drill of FIG. 1 where the chip evacuation flute is present.

Also, in a cross-section orthogonal to the rotation center axis O at a position where the chip evacuation flute 10 is present as illustrated in FIG. 3, the web thickness d is from 0.10 to 0.25 times the diameter D of the drill 1. When the web thickness d is smaller than 0.10 times the diameter D of the drill 1, the strength of the drill 1 is reduced and the drill 1 can be damaged. When the web thickness d is greater than 0.25 times the diameter D of the drill 1, the chip evacuation flute 10 becomes smaller, and the chips can easily become blocked. Note that the web thickness d is defined as the diameter of the largest circle c that can be drawn in the center portion of the drill 1, and as illustrated in FIG. 3, is equal to the distance between the two flute bottoms 11 of the chip evacuation flutes 10. Note that the flute bottoms 11, 11 are provided in each of the two chip evacuation flutes 10. Also, according to the present embodiment, the flute bottom 11 is included in the first gash 6. A more preferable range for the web thickness d is from 0.13 to 0.25 times the diameter D, and a still more preferable range is from 0.15 to 0.20 times the diameter D.

Two first gashes 6 are provided with point symmetry about the center O1. Also, when the drill 1 is viewed from the tip side, a central ridge portion 8 is provided in a portion that includes the center O1 and is sandwiched between the two first gashes 6, 6. When the central ridge portion 8 is viewed from the side direction, the central ridge portion tip angle β from the both sides of the central ridge portion 8 towards the center O1 is from 170 to 190°, and the ratio of the length (L) of the central ridge portion 8 to the diameter (D) of the drill 1 (L/D) is from 0.15 to 0.25. As a result of the presence of the central ridge portion 8 with this configuration, the chip evacuation performance is good, and breakage of the central ridge portion 8 can be reduced. Here, the diameter D of the drill 1 indicates the distance between the outer peripheral edges of the two cutting edges 3, 3, and when a hole is drilled using the drill 1 of diameter D, a hole of diameter D can be formed. Also, the central ridge portion angle β indicates the angle formed by the ridge lines on both sides with the rotation center axis O as the center for the end portion ridge lines on the tip side when the central ridge portion 8 is viewed from the side. In addition, the length (L) of the central ridge portion 8 indicates the length between two first gash ridge lines 9, which are the intersecting ridge lines between the first gash 6 and the heel 4, at the center O1 when the two first gash ridge lines 9 are extended.

Also, according to the present embodiment, the ratio (W/L) of the width (W) of the central ridge portion 8 to the length (L) of the central ridge portion 8 is from 0.15 to 0.40. In this way, the cutting resistance near the center O1 can be reduced, and damage to the central ridge portion 8 can be reduced. Here, the width (W) of the central ridge portion 8 indicates the width of the central ridge portion 8 at the center O1.

Note that in the present embodiment, the ratio (a/D) of the distance (a) from the cutting edge 3 to the terminating edge of the first gash 6 to the drill diameter (D) is from 0.3 to 0.5. The first gash 6 enlarges the chip evacuation flute 10 near the cutting edge 3, and has the action of minimizing blockage within the chip evacuation flute 10 of chips with an undefined forward direction immediately after being generated.

In addition, the opening angle γ of the chip evacuation flute 10 illustrated in FIG. 3 is from 85 to 110°. When the opening angle γ is smaller than 85°, the chip evacuation flute 10 becomes smaller, and the chips can easily become blocked. When the opening angle γ is greater than 110°, the chips fly out from the chip evacuation flute 10 without being curled by the chip evacuation flute 10, so the chips impact the machined surface and the machined surface becomes rough. Note that the opening angle γ of the chip evacuation flute 10 illustrated in FIG. 3 is defined as the angle formed between the straight line L1 that joins the outer peripheral end P of the chip evacuation flute 10 on the cutting edge 3 side and the rotation center axis O (indicated with a broken line), and the straight line L2 that joins the outer peripheral end Q of the chip evacuation flute 10 on the heel 4 side and the rotation center axis O (indicated with a broken line).

Also, in a cross-section that is orthogonal to the rotation center axis O at a position in which the chip evacuation flute is present in FIG. 3, the drill 1 is formed from a curve whose radius of curvature gradually becomes smaller from a cutting edge side wall surface 14 located on the cutting edge 3 side of the chip evacuation flute 10, passing through the flute bottom 11, towards a heel side wall surface 15 located on the heel 4 side. In this way it is difficult for the chips to be curled up small or divided, but the chips are curled to an appropriate degree and are smoothly delivered to the rear along the curved surface of the chip evacuation flute 10. Therefore, good chip evacuation performance can be maintained without the chips becoming blocked in the chip evacuation flute 10, even when the discharge rate is increased.

Here, according to the present embodiment, the radius of curvature at the outer peripheral end P of the cutting edge side wall surface 14 is from 1.10 to 1.60 times the diameter D of the drill 1, the radius of curvature at the flute bottom 11 is from 0.56 to 0.9 times the diameter D of the drill 1, and the radius of curvature at the outer peripheral end Q of the heel side wall surface 15 is from 0.45 to 0.55 times the diameter D of the drill 1. Here, in the present invention, the flute bottom 11 is defined as the point of intersection of the drill 1 and the circle c of diameter d used to define the web thickness d. Also, the cutting edge side wall surface 14 is defined as being on the side of the point P from the flute bottom 11, and the heel side wall surface 15 is defined as being on the side of the point Q from the flute bottom 11. Also, in the present invention, when measuring the radius of curvature from the cutting edge side wall surface 14 to the heel side wall surface 15, in the cross-sectional view of FIG. 3, the curved line of the cutting edge side wall surface 14 and the curved line of the heel side wall surface 15 are each divided into four equal parts, and the radius of curvature is measured at eight locations for each of the parts, and compared. Also, the radius of curvature at the flute bottom 11 is obtained as the radius of curvature within the range that includes the two locations adjacent to the flute bottom 11 from among the eight locations.

Figure 4:
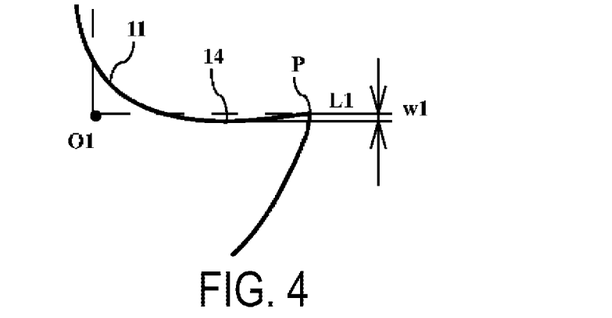
FIG. 4 is an enlarged view near the cutting edge side wall surface in the drill of FIG. 3.

Also, in the present embodiment, as illustrated in FIG. 4, the cutting edge side wall surface 14 has a concavity in the counter rotational direction relative to the straight line L1 that connects the outer peripheral end P of the cutting edge side wall surface 14 and the rotation center axis O, and the concavity depth w1 of the cutting edge side wall surface 14 is from 0.01 to 0.04 times the diameter D of the drill 1. In this way, the cutting edge 3 that extends along the cutting edge side wall surface 14 also has a shape with a concavity, so relief is provided on the cutting edge 3 and the bite of the cutting edge 3 is good.

Here, in the present embodiment, when viewed from the tip side, the cutting edge 3 is recessed in the counter rotational direction of the drill 1, and the height (H) of the recess of the cutting edge 3 has a size equal to or smaller than the width (W) of the central ridge portion 8. In other words, the cutting edge 3 side of the heel 4 is depressed into a recess, and the amount of the depression (H) of the cutting edge 3 side of the heel 4 corresponding to the height (H) of the recess of the cutting edge 3 has a size equal to or smaller than the width (W) of the central ridge portion 8. In this way, the height of the protrusion formed in the machined surface with the drill 1 can be reduced, which has the effect that the machined surface of the drill 1 is flatter. Note that the height of the protrusion formed on the machined surface cut with the drill 1 reflects the height (H) of the recess portion of the cutting edge 3. The preferred range of H/W is from 0.51 to 0.70.

Figure 5:
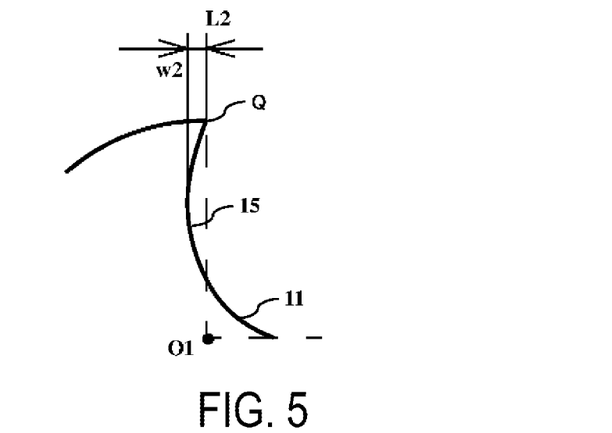
FIG. 5 is an enlarged view near the heel side wall surface in the drill of FIG. 3.

Also, as illustrated in FIG. 5, the heel side wall surface 15 has a concavity in the rotational direction relative to the straight line L2 that connects the outer peripheral end Q of the heel side wall surface 15 and the rotation center axis O, and the maximum concavity depth w2 of the heel side wall surface 15 is from 0.05 to 0.10 times the diameter D of the drill 1. In this way, the chips can be discharged to the rear side while curling the chips in the desired shape, without hindering the flow of the chips.

Also, a second gash 18 is provided on the outer peripheral end of the cutting edge 3, in other words at the corner between the tip face of the cutting edge 3 and the outer peripheral surface. In this way, damage to the corner can be reduced.

In addition, according to the present embodiment, the chip evacuation performance is good and particularly effective in the case of drills 1 for which the diameter (D) is small, 3 mm or less, and in particular 1 to 3 mm, and for which the volume of the chip evacuation flute 10 is small.

Working Example 1

Drills were prepared with a drill body made from cemented carbide alloy coated with a (TiAl) N-type hardened layer and with shapes as shown in Table 1. Note that the radius of curvature from the cutting edge side wall surface to the heel side wall surface was obtained by dividing the curve of the cutting edge side wall surface 14 and the curve of the heel side wall surface 15 into four equal parts each, and measuring the radius of curvature at the eight locations corresponding to the parts. Table 1 only shows the results for the portion that includes the point P (indicated as P in the table), the flute bottom, and the portion that includes the point Q (indicated as Q in the table), but the radius of curvature between the portion that includes the point P and the flute bottom, and between the flute bottom and the portion that includes the point Q were values between the two radii of curvature. Also, the performance of the drills was evaluated under the following cutting conditions. The results are shown in Table 2.

(Cutting Conditions)
Work material: S45C
Drill diameter: φ8 mm
Cutting speed: 75 m/minute
Spindle revolution: 3000 rpm
Feed rate: 0.14 mm/revolution
Cutting depth: 12 mm
Cutting form: Plunge milling
Cutting environment: Wet cutting
Evaluation items: Shape of machined bottom face, chip evacuation performance after processing 250 holes, number of holes that could be processed, status of the drill at the time of completion of processing

TABLE 1

| Specimen No | Drill tip angle α (°) | Web thickness d/D* | γ** (°) | a/D* | P | Radius of curvature/D* Flute bottom | Q | Concavity depth/D* Cutting edge side wall surface | Heel side wall surface | Radius of curvature at flute bottom/D* |
|---|---|---|---|---|---|---|---|---|---|---|
| I-1  | 165 | 0.15 | 90  | 0.25 | 1.4   | 0.625 | 0.55  | 0.021 | 0.06  | 0.625 |
| I-2  | 170 | 0.15 | 90  | 0.25 | 1.4   | 0.625 | 0.55  | 0.021 | 0.06  | 0.625 |
| I-3  | 180 | 0.15 | 90  | 0.25 | 1.4   | 0.625 | 0.55  | 0.021 | 0.06  | 0.625 |
| I-4  | 190 | 0.15 | 90  | 0.25 | 1.4   | 0.625 | 0.55  | 0.021 | 0.06  | 0.625 |
| I-5  | 195 | 0.15 | 90  | 0.25 | 1.4   | 0.625 | 0.55  | 0.021 | 0.06  | 0.625 |
| I-6  | 180 | 0.05 | 90  | 0.25 | 1.4   | 0.625 | 0.55  | 0.021 | 0.06  | 0.625 |
| I-7  | 180 | 0.1  | 90  | 0.25 | 1.4   | 0.625 | 0.55  | 0.021 | 0.06  | 0.625 |
| I-8  | 180 | 0.2  | 90  | 0.25 | 1.4   | 0.625 | 0.55  | 0.021 | 0.06  | 0.625 |
| I-9  | 180 | 0.25 | 90  | 0.25 | 1.4   | 0.625 | 0.55  | 0.021 | 0.06  | 0.625 |
| I-10 | 180 | 0.15 | 80  | 0.25 | 1.4   | 0.625 | 0.55  | 0.021 | 0.06  | 0.625 |
| I-11 | 180 | 0.15 | 85  | 0.25 | 1.4   | 0.625 | 0.55  | 0.021 | 0.06  | 0.625 |
| I-12 | 180 | 0.15 | 110 | 0.25 | 1.4   | 0.625 | 0.55  | 0.021 | 0.06  | 0.625 |
| I-13 | 180 | 0.15 | 115 | 0.25 | 1.4   | 0.625 | 0.55  | 0.021 | 0.06  | 0.625 |
| I-14 | 180 | 0.15 | 90  | 0.25 | 1.4   | 0.625 | 1.4   | 0.021 | 0.06  | 0.625 |
| I-15 | 180 | 0.15 | 90  | 0.25 | 1.4   | 0.625 | 1     | 0.021 | 0.06  | 0.625 |
| I-16 | 180 | 0.15 | 90  | 0.25 | 1.4   | 0.625 | 0.55  | 0     | 0.06  | 0.625 |
| I-17 | 180 | 0.15 | 90  | 0.25 | 1.4   | 0.625 | 0.55  | 0.05  | 0.06  | 0.625 |
| I-18 | 180 | 0.15 | 90  | 0.25 | 1.4   | 0.625 | 0.55  | 0.021 | 0.031 | 0.625 |
| I-19 | 180 | 0.15 | 90  | 0.25 | 1.4   | 0.625 | 0.55  | 0.021 | 0.188 | 0.625 |
| I-20 | 180 | 0.15 | 90  | 0.25 | 1.125 | 0.5   | 0.375 | 0.021 | 0.06  | 0.500 |
| I-21 | 180 | 0.15 | 90  | 0.25 | 1.4   | 1.0   | 0.75  | 0.021 | 0.06  | 1.000 |
| I-22 | 180 | 0.3  | 90  | 0.4  | 1.4   | 0.625 | 0.55  | 0.021 | 0.06  | 0.625 |
| I-23 | 180 | 0.25 | 90  | 0.4  | 1.4   | 0.625 | 0.55  | 0.021 | 0.06  | 0.625 |
| I-24 | 180 | 0.25 | 90  | 0.3  | 1.4   | 0.625 | 0.55  | 0.021 | 0.06  | 0.625 |
| I-25 | 180 | 0.25 | 90  | 0.5  | 1.4   | 0.625 | 0.55  | 0.021 | 0.06  | 0.625 |
| I-26 | 180 | 0.25 | 90  | 0.55 | 1.4   | 0.625 | 0.55  | 0.021 | 0.06  | 0.625 |

*D: Diameter of drill
**γ (°): Opening angle of chip evacuation flute

TABLE 2

| Specimen No | Cutting performance Shape of machined bottom face | Chip evacuation performance | Number of holes processed (No.) | Drill status |
|---|---|---|---|---|
| I-1  | Recessed       | Good                              | 400 | Constant wear  |
| I-2  | Virtually flat | Good                              | 400 | Constant wear  |
| I-3  | Flat           | Good                              | 400 | Constant wear  |
| I-4  | Virtually flat | Good                              | 360 | Small chipping |
| I-5  | Protruding     | —                                 | 230 | Defect         |
| I-6  | Flat           | —                                 | 25  | Bending damage |
| I-7  | Flat           | Good                              | 350 | Chattering     |
| I-8  | Flat           | Good                              | 400 | Constant wear  |
| I-9  | Flat           | Tended to block                   | 290 | Constant wear  |
| I-10 | Flat           | Tended to block                   | 270 | Large wear     |
| I-11 | Flat           | Good                              | 380 | Constant wear  |
| I-12 | Flat           | Tended to extend outside the flute | 370 | Constant wear  |
| I-13 | Flat           | Contact with machined surface     | 260 | Constant wear  |
| I-14 | Flat           | Tended to block                   | 255 | Large wear     |
| I-15 | Flat           | Tended to block                   | 275 | Large wear     |
| I-16 | Flat           | Good                              | 300 | Wear           |
| I-17 | Flat           | Good                              | 300 | Small chipping |
| I-18 | Flat           | Tended to extend outside the flute | 325 | Constant wear  |
| I-19 | Flat           | Tended to block                   | 315 | Wear           |
| I-20 | Flat           | Tended to block                   | 320 | Wear           |
| I-21 | Flat           | Tended to extend outside the flute | 330 | Constant wear  |
| I-22 | Flat           | Tended to block                   | 275 | Wear           |
| I-23 | Flat           | Good                              | 450 | Constant wear  |
| I-24 | Flat           | Good                              | 400 | Constant wear  |
| I-25 | Flat           | Good                              | 360 | Constant wear  |
| I-26 | Flat           | Tended to extend outside the flute | 320 | Chattering     |

As shown in Tables 1 and 2, with Specimen No. I-1 in which the drill tip angle was smaller than 170°, the machined bottom face had a recessed shape, and with Specimen No. I-5 in which the drill tip angle was larger than 190°, the machined bottom face had a protruding shape, and it was not possible for both to produce a bottom face that was flat or substantially flat. Also with Specimen No. I-5 the outer peripheral end of the cutting edge became damaged, so the number of holes machined was small. In addition, with Specimen No. I-6 in which the web thickness was smaller than 0.10 times the drill diameter, the drill suffered bending damage. Also, with Specimen No. I-22 in which the web thickness was larger than 0.25 times the drill diameter, and Specimen I-10 in which the chip evacuation flute opening angle was smaller than 85°, the chip evacuation flute was small, and the chips tended to become blocked. With Specimen I-13 in which the opening angle of the chip evacuation flute was larger than 110°, the chips flew out from the chip evacuation flute and contacted the machined surface, so the surface roughness of the machined surface was poor. In addition, with Specimen I-14 in which the radius of curvature of the cutting edge side wall surface and the heel side wall surface were the same and the radius of curvature at the flute bottom was smaller than that at the heel side wall surface, and Specimen I-15 in which the radius of curvature at the flute bottom was smaller than that at the heel side wall surface, the chips scratched the wall surface of the chip evacuation flute and the flow of chips was poor, and the chips tended to be come blocked.

In contrast, with Specimen Nos. I-2 to 4, 7 to 9, 11, 12, 16 to 21, 23 to 26, in which the drill tip angle was from 170 to 190°, the web thickness was from 0.10 to 0.25 times the drill diameter, the opening angle of the chip evacuation flute was from 85 to 110°, and the radius of curvature gradually reduced from the cutting edge side wall surface to the heel side wall surface, the shape of the machined bottom face was flat or substantially flat, the chip evacuation performance and the drill attitude was good, and the number of holes drilled was large.

Working Example 2

Drills were prepared with the drill body of Working Example 1 coated with the hardened layer of Working Example 1 with shapes of FIGS. 1 to 3 and the dimensions as shown in Table 3. Note that the drill diameter was 3 mm, the web thickness was 0.45 mm, the drill tip angle α was 180°, the chip evacuation flute opening angle γ when viewed from the tip was 89°, and a/D was 0.4. Also, the performance of the drills was evaluated under the following cutting conditions. The results are shown in Table 3.

(Cutting Conditions)
  Work material: S45C
  Drill diameter: φ3 mm
  Cutting speed: 75 m/minute
  Spindle revolution: 8000 rpm
  Feed rate: 0.065 mm/revolution
  Cutting depth: 4.5 mm
  Cutting form: Plunge milling
  Cutting environment: Wet cutting
  Evaluation items: Shape of machined bottom face, chip evacuation performance after processing 250 holes, number of holes processed, status of the drill cutting edge at the time of completion of processing

TABLE 3

| Specimen No | Central ridge portion tip angle β (°) | Central ridge portion (mm) L/D | W | W/L | H | Height of protrusion or recess on machined bottom face (μm) | Chip evacuation performance | No. holes processed (No.) | Bottom edge status |
|---|---|---|---|---|---|---|---|---|---|
| II-1 | 167 | 0.20 | 0.150 | 0.250 | 0.090 | 140 | Good | 210 | Small chipping |
| II-2 | 170 | 0.20 | 0.150 | 0.250 | 0.090 | 131 | Good | 360 | Constant wear |
| II-3 | 180 | 0.20 | 0.155 | 0.258 | 0.090 | 4 | Good | 500 | Constant wear |
| II-4 | 190 | 0.20 | 0.155 | 0.258 | 0.090 | 131 | Good | 360 | Small chipping |
| II-5 | 193 | 0.20 | 0.155 | 0.258 | 0.090 | 140 | Good | 200 | Corner chipping |
| II-6 | 180 | 0.14 | 0.150 | 0.250 | 0.090 | 4 | Tended to block | 240 | Chattering |
| II-7 | 180 | 0.15 | 0.150 | 0.250 | 0.090 | 6 | Good | 250 | Chattering |
| II-8 | 180 | 0.25 | 0.170 | 0.283 | 0.090 | 4 | Good | 200 | Small chipping |
| II-9 | 180 | 0.26 | 0.170 | 0.283 | 0.090 | 4 | Tended to extend | 300 | Central ridge portion chipping |
| II-10 | 180 | 0.20 | 0.085 | 0.142 | 0.090 | 4 | Good | 300 | Small chipping |
| II-11 | 180 | 0.20 | 0.160 | 0.267 | 0.090 | 4 | Good | 500 | Constant wear |
| II-12 | 180 | 0.20 | 0.170 | 0.283 | 0.100 | 7 | Good | 500 | Constant wear |
| II-13 | 180 | 0.20 | 0.300 | 0.500 | 0.090 | 5 | Good | 450 | Chattering |
| II-14 | 180 | 0.20 | 0.170 | 0.283 | <0.005 | <1 | Good | 300 | Small chipping |

TABLE 3-continued

| Specimen No | Central ridge portion tip angle β (°) | Central ridge portion (mm) | | | | Height of protrusion or recess on machined bottom face (μm) | Chip evacuation performance | No. holes processed (No.) | Bottom edge status |
|---|---|---|---|---|---|---|---|---|---|
| | | L/D | W | W/L | H | | | | |
| II-15 | 180 | 0.20 | 0.150 | 0.250 | 0.110 | 14 | Good | 300 | Constant wear |
| II-16 | 180 | 0.20 | 0.180 | 0.300 | 0.130 | 17 | Good | 300 | Constant wear |

As can be seen from Table 3, in all the test specimens, the shape of the machined bottom face was flat or the protrusion or recess was smaller than 150 μm, the chip evacuation performance and the status of the drill were good, and the number of holes processed was large. In particular, with Specimen Nos. II-2 to 4, 7, 8, and 10 to 16 in which L/D was from 0.15 to 0.25 and the central ridge portion tip angle β was from 170 to 190°, the chip evacuation performance and the drill status was good, chipping did not occur in the central ridge portion, and the number of holes processed was large.

REFERENCE SIGNS LIST

1 Drill
2 Drill body
3 Cutting edge
4 Heel
5 Tip relief face
6 First gash
8 Central ridge portion
9 First gash ridge line
10 Chip evacuation flute
11 Flute bottom
13 Heel trailing edge
14 Cutting edge side wall surface
15 Heel side wall surface
17 First gash trailing edge
18 Second gash
O Rotation center axis
D Drill diameter
α Drill tip angle
β Central ridge portion tip angle
γ Chip evacuation flute opening angle
c The largest circle that can be drawn in the center portion of the drill in a cross-section orthogonal to the rotation center axis at a position where the chip evacuation flute is present
d Web thickness
P Outer peripheral end of the chip evacuation flute at the cutting edge side
Q Outer peripheral end of the chip evacuation flute at the heel side
L1 Straight line connecting the point P and the rotation center axis O
L2 Straight line connecting the point Q and the rotation center axis O
w1 Maximum concavity depth of cutting edge side wall surface
w2 Maximum concavity depth of heel side wall surface

The invention claimed is:

1. A drill, comprising:
a drill body comprising a rotation center axis;
two cutting edges provided on a tip side of the drill body;
a chip evacuation flute provided to a rear of the two cutting edges and in a drill rotational direction from each of the two cutting edges; and
two heels provided in a drill counter rotation direction from the two cutting edges;
in a cross-section orthogonal to the rotation center axis at a position axially rearward of the cutting edge where the chip evacuation flute is present, a radius of curvature of the chip evacuation flute continuously becoming smaller from a first outer peripheral end of a cutting edge side wall surface at a position on a cutting edge side to a second outer peripheral end of a heel side wall surface at a position on a heel side.

2. The drill according to claim 1, wherein the cutting edge side wall surface has a concavity in the counter rotational direction with respect to a straight line connecting the first outer peripheral end and the rotation center axis, and the maximum concavity depth of the cutting edge side wall face is from 0.01 to 0.04 times the drill diameter, the heel side wall surface has a concavity in the rotational direction with respect to a straight line connecting the second outer peripheral end and the rotation center axis, and the maximum concavity depth of the heel side wall surface is from 0.05 to 0.10 times the drill diameter.

3. The drill according to claim 1, wherein the radius of curvature at a flute bottom of the chip evacuation flute is from 0.56 to 0.9 times the drill diameter.

4. The drill according to claim 1, wherein a first gash is provided at an end in the counter rotational direction of each of the two heels; in a circle with the rotation center axis as center when viewed from the tip side, a central ridge portion that is sandwiched between the two first gashes is disposed including the center; and a ratio (L/D) of a length (L) of the central ridge portion to the drill diameter (D) is from 0.15 to 0.25, and, when viewed from the side a central ridge portion tip angle toward the center of the central ridge portion is from 170 to 190°.

5. The drill according to claim 4, wherein a ratio (W/L) of a width (W) of the central ridge portion to the length of the central ridge portion (L) is from 0.15 to 0.40.

6. The drill according to claim 5, wherein when viewed from the tip side, the cutting edge comprises a depression in the counter rotation direction, and a height (H) of the depression of the cutting edge is not greater than the width (W) of the central ridge portion.

7. The drill according to claim 1, wherein the drill diameter (D) is not more than 3 mm.

8. The drill according to claim 1, wherein a first gash is provided at an end in the counter rotational direction of each of the two heels and a second gash is provided on the outer peripheral side of the cutting edge.

9. The drill according to claim 1, wherein a first gash is provided at an end in the counter rotational direction of each of the two heels and a ratio (a/D) of a distance (a) from the cutting edge to a terminating end of the first gash to the drill diameter (D) is from 0.3 to 0.5.

10. A drill, comprising:
a body having a rotational axis at a center thereof in a cross section that is perpendicular to the rotational axis, and comprising:
  a front tip;
  a rear end;
  a boundary between the front tip and the rear end; and
  a side surface between the front tip and the boundary; and
a flute in spiral at the side surface,
the drill further comprising, in the cross section at the side surface positioned axially rearward of the front tip, a boundary line between the body and the flute,
the boundary line comprising:
  a first end at a first intersection of the side surface, having a first curvature radius;
  a second end at a second intersection of the side surface, having a second curvature radius; and
  a middle point between the first end and the second end, having a third curvature radius, wherein
the first curvature radius is larger than the third curvature radius, and
the third curvature radius is larger than the second curvature radius.

11. The drill according to claim 10, wherein
the first end is located at a rear side of a rotation direction in the boundary line, and the second end is located at a front side of the rotation direction in the boundary line.

* * * * *